DEFLECTION YOKE

INVENTORS
JERROLD K. KRATZ &
MAXIMILIAN J. OBERT
BY W. H. Sprague
ATTORNEY

DEFLECTION YOKE

Filed March 18, 1953 2 Sheets-Sheet 2

INVENTORS
JERROLD K. KRATZ &
MAXIMILIAN J. OBERT

BY [signature]
ATTORNEY

United States Patent Office 2,821,671

Patented Jan. 28, 1958

2,821,671

DEFLECTION YOKE

Jerrold K. Kratz, Haddonfield, and Maximilian J. Obert, Merchantville, N. J., assignors to Radio Corporation of America, a corporation of Delaware Application March 18, 1953, Serial No. 343,068

13 Claims. (Cl. 317—200)

This invention relates to deflection yokes and particularly to yokes adapted for television uses, both black and white and color, where comparatively wide angle beam deflection is desired.

As the angle through which an electron beam or a group of beams is to be deflected for raster-scanning purposes in television apparatus becomes larger, it becomes increasingly difficult to maintain good beam focus or convergence of a plurality of beams throughout all portions of the raster and, at the same time, to maintain substantial rectangularity of the raster and also to minimize the power required to energize the deflection yoke. Heretofore, deflection yokes which are capable of deflecting an electron beam to scan a substantially rectangular raster have not been necessarily of the proper kind to maintain good beam focus throughout the raster. Accordingly, compromises have been made. One such compromise is to design the yoke so as to maintain good beam focus throughout a relatively wide deflection angle without regard to raster rectangularity. Such yokes tend to produce distortions such as pin-cushion raster shapes, for example. Additional means such as fixed magnets or special pin-cushion correction circuits have been employed at added cost and difficulty to make some compensation for the raster distortion. Furthermore, it has been necessary by the use of prior art deflection yokes to utilize relatively large amounts of deflection power to energize such yokes so as to deflect the beam through a wider angle.

One of the objects of the present invention, therefore, is to provide an electromagnetic deflection yoke for cathode ray tubes which is more efficient than yokes heretofore employed.

Another object of the invention is to provide an improved deflection yoke for black and white and/or color television apparatus, for example, which will maintain good beam focus and/or convergence of a plurality of beams throughout a relatively wide deflection angle.

Still another object of the invention is to provide an improved deflection yoke by which an electron beam may be caused to scan a substantially rectangular raster on a wide angled, curved face black and white television kinescope while maintaining good beam focus.

A further object of the invention is to provide an improved deflection yoke which has a greater deflection sensitivity than yokes heretofore employed so that substantially less power is required to energize such a yoke, when operating at moderate deflection angles, and no more power is required to operate it through relatively large angles than is presently utilized with commercially available yokes operating with moderate deflection angles.

In accordance with the present invention, the improved type of deflection yoke has two portions, one of which is relatively straight and extends substantially parallel to the longitudinal axis of the yoke and the other of which is flared, deviating from the central axis at the forward end of the yoke. The configuration of the flared section is such as to effectively extend the active conductors of the coils and, at the same time, to remove the end turns from the beam deflection region with the result that the ratio of the desired field flux to the undesired flux produced by the end turns is considerably increased, thereby both increasing the deflection sensitivity and the angle through which the electron beam may be deflected effectively to scan a substantially rectangular raster. The deflection sensitivity also is enhanced by the use of a core so arranged as to conform closely to the configuration of the yoke windings, not only in the straight section but also in the flared section as well. The distribution of turns in the windings of the deflection yoke is made in such a way as to insure good beam focus and/or convergence of a plurality of beams throughout the entire raster scanned by the electron beam.

For black and white television uses of the improved deflection yoke, any of the commercially available kinescopes and/or camera pick-up tubes may be utilized. Such a yoke also may be used with such color television apparatus as either of the tri-color kinescopes described in papers published in the Proceedings of the I. R. E., vol. 39, No. 10, October 1951, "A three-gun shadow-mask color kinescope," by H. B. Law, at page 1186, or "A one-gun shadow mask color kinescope," by R. R. Law, at page 1194. The three-gun color kinescope forms the subject matter of U. S. Patent No. 2,595,548, issued May 6, 1952, to A. C. Schroeder. The one-gun color kinescope is the subject matter of a copending U. S. patent application of R. R. Law, Serial No. 165,552, filed June 1, 1950, and titled "Color Television."

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figures 1, 4, 5:
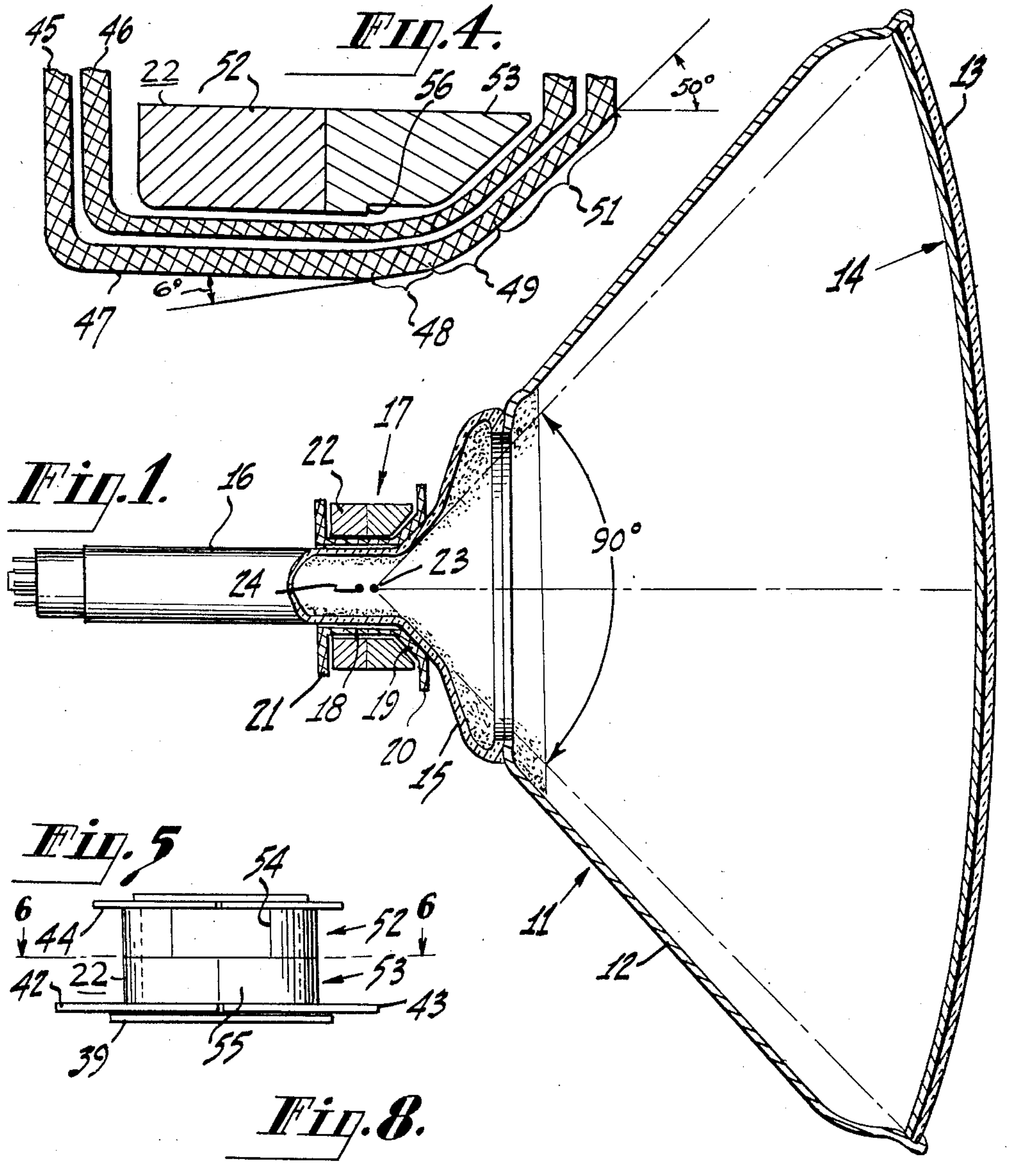
Figure 1 is a general view, partly in cross-section, of a yoke in accordance with the present invention in an operative position with a cathode ray tube having a relatively large screen requiring a relatively wide deflection angle.
Figure 4 is a fragmentary detail, to an enlarged scale, of the coil windings and associated core showing the details of the flared end portion in accordance with the invention.
Figure 5 is a plan view of a deflection yoke in accordance with this invention showing the relationship of the core segments to one another.

Reference first will be made to Figure 1 of the drawings for a description of the general relationship of a yoke embodying the invention to a cathode ray tube such as a kinescope employed for image reproduction in a television receiver. The kinescope 11 may be of the so-called metal type in which the major portion of the conical section 12 thereof is sealed to a glass face plate 13 on the inner surface of which is formed the luminescent screen 14. The small end of the conical section 12 is sealed to a glass conical section 15 which merges into a neck 16.

A deflection yoke 17 in accordance with this invention is mounted over the neck 16 and extends onto the conical glass section 15. As indicated, the deflection yoke is provided with coils, each having a straight section 18 extending substantially parallel to a central axis of the coil which coincides with the longitudinal axis of the kinescope 11, and a flared section 19 at the forward end of the yoke which deviates from the central axis in a manner to be described in greater detail subsequently. The active side conductors of the yoke are included in the sections 18 and 19. The forward end conductors 20 are spaced away from the central axis more than a minimum distance so as to minimize the effect thereof. The end conductors 21 at the rear end of the yoke may also, if desired, be spaced away from the central axis more than a minimum distance although, in a particular embodiment of the yoke in accordance with the present invention, this is not done to the same degree as it is in the forward end of the yoke on account of the relatively smaller deleterious effect that the rear end conductors 21 have because of greater distance to the undeflected beam at the back end of the yoke. The yoke also is provided with a ferromagnetic core 22, the configuration and arrangement of which comprises a feature of the invention and, accordingly, will be described in greater detail subsequently. It is to be understood that a certain minimum clearance is maintained, as indicated, between the yoke and the neck of the kinescope 11 in a manner to be described subsequently.

It is to be noted that, by reason of the general configuration of the yoke 17, the effective deflection center 23 is located considerably forward of what would be the effective center of deflection 24 of a conventional yoke. It is seen that, with an effective center of deflection 23, it is possible to deflect an electron beam through a substantially wider angle than heretofore possible with a yoke of this length (for example, 90°) without the beam striking any portion of the tube envelope, which would cause the so-called "neck shadow." A considerably smaller angle of deflection necessarily results from an effective center deflection, such as 24. The forwardly spaced effective center of deflection 23 is a direct result of the use of an improved type of deflection yoke, such as that embodying the present invention. In general, this result is achieved by the particular configuration of such a yoke having both a straight section and a forwardly extending flared section of both coils and core. Not only is the center of deflection moved forwardly from what its position would be with more conventional prior art types of yokes, but also the overall effective length of the yoke is increased by the employment of the features such as the described configuration of the improved yoke embodying the invention. The increase in the effective length of the yoke also increases the efficiency thereof, whereby the yoke in accordance with this invention has a materially higher deflection sensitivity than prior art yokes.

Before continuing with the detailed description of other constructional features of a deflection yoke in accordance with the present invention, reference will be made to Figure 2 for a brief description of the fields produced by the different parts of a deflection yoke winding. In this figure, the two coils of one of the yoke windings are shown in a somewhat conventional form. In this case, the two coils 25 and 26 of a horizontal yoke winding are shown. Since each is substantially similar to the other, only one will be referred to. The upper coil 25, for example, has side conductors such as 27 and end conductors such as 28. Current flowing through the side conductors 27 produce magnetic flux constituting a "Y" field extending in a general vertical direction, as shown. It will be understood that another pair of coils comprising the vertical winding will ordinarily be located in a substantially 90° relationship to the two horizontal winding coils and when energized are effective to produce magnetic flux comprising an "X" field substantially at right angles to the "Y" field, as shown. These are the two desired deflection field components. However, the end conductors of the deflection coil windings, such as the end conductors 28, also produce a major flux field in the "Z" direction which extends generally coaxially with the yoke. This "Z" field is undesired since it is not in the proper direction for deflecting the electron beam, but instead it only produces an undesired distortion of the beam cross section, beam defocusing, and misconvergence in multi beam kinescopes, such as the tri-color kinescopes referred to. In any wide angle deflection yoke, therefore, it is now seen to be desirable and necessary to minimize or completely eliminate, if possible, the effectiveness of the "Z" field component or at best to increase the ratio of the "X" and "Y" field effectiveness to the "Z" field effectiveness. In the case of the wide angle deflection yoke embodying the present invention, the effectiveness of the "Z" component is decreased in absolute value. Also, the ratio of the "X" and "Y" field effectiveness to the "Z" field effectiveness is increased by reason of the effective increase in the absolute values of the "X" and "Y" fields.

In order to more clearly understand the manner in which the efficiency of the yoke embodying the present invention is achieved, further reference will be made to Figure 3. The perspective view of the forward end of the deflection yoke 17 in accordance with this invention shows generally the essential portions of the horizontal deflection winding coils 31 and 32. Since both of these coils are substantially identical, the details of only one of them will be described. The lower soil 32 includes side conductors having main portions 33*a* extending for a relatively large distance along, and lying substantially parallel to, the central axis of the yoke. The side conductors also have extended portions 33*b* extending for a smaller distance along, and deviating from, the central axis. The two parallel side conductor portions of one horizontal coil shown at 33*a*, together with corresponding side conductor portions of the other horizontal coil and with similar portions of the two coils 34 and 35 comprising the vertical winding, form the straight section of the yoke. The two extended side conductor portions 33*b* of the horizontal coil 32, together with corresponding conductor portions of the other horizontal coil 31 and with similar portions of the two vertical coils 34 and 35 form the flared section of the yoke. The particular deviation of the extended side conductor portions, such as 33*b*, from the central axis will be described subsequently in greater detail.

Each of the groups of side conductors 33 of each of the horizontal coils 31 and 32 and of each of the vertical coils 34 and 35 extend circumferentially around the central axis of the coil through respective predetermined angles. These angles are the same for each of the horizontal coils and also for each of the vertical coils, although in the particular illustrated embodiment of the invention, the angles are different for the horizontal and vertical coils. In any case, the circumferential angle for each group of side conductors is less than 90° so that for any two groups of corresponding side conductors the angle is less than 180°. Accordingly, there is an opening, or window, formed substantially at the center of each of the coils. In the case of the horizontal coil 32, the opening, or window, 36 is formed in this manner. A similar opening, or window, 37, is formed in the vertical coil 35 and is shown by the dotted lines, since the vertical coils lie outside of the horizontal coils. In accordance with one of the features of this invention, it is to be noted that the coil windows, such as 36 and 37, extend circumferentially around the central axis through a predetermined, substantially constant angle in all cross sections of the coils at right angles, or normal, to the central axis in both parallel and deviating portions of the side conductors. In other words, the window opening is the same number of degrees of arc in all axially normal cross sections of both the straight and flared portions of the yoke coils.

Figures 2, 3, 6, 7:
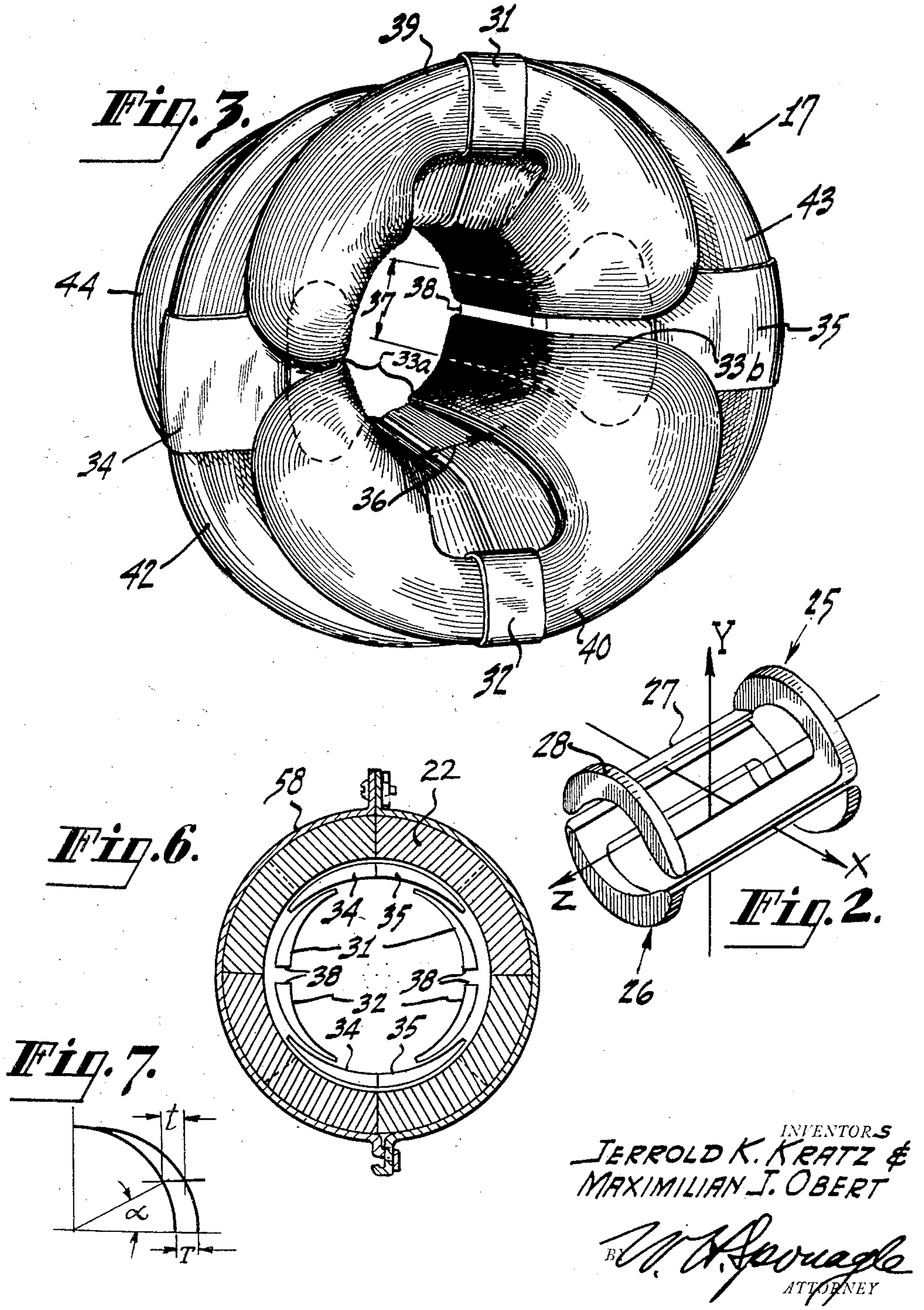
Figure 2 is a perspective view of a pair of deflection windings of a conventional nature showing the different field flux components produced respectively by the side and end conductors.
Figure 3 is a perspective view of the front end of a deflection yoke embodying the invention.
Figure 6 is a transverse sectional view through a central portion of the yoke taken on the lines 6—6 of Figure 5 and showing the cross-sectional coil configuration and the general relationship of the coils and core in accordance with the invention.
Figure 7 is an explanatory diagram indicating the turns distribution of the yoke coils; and, Figure 8 shows typical field flux patterns in different transverse sections of the yoke embodying the invention.

Another feature of the invention which may be seen from Figure 3 is a gap 38 which is maintained between the adjacent outer edges of the respective side conductor groups of a pair of coils such as the horizontal coils 31 and 32. As will be more clearly illustrated in connection with a subsequent portion of the description, the two gaps, such as 38, between the horizontal coils 31 and 32 are maintained between those portions of the coils which have the greater proportion of conductors. Such a feature is effective in minimizing raster distortion, such as the pin cushion type, when the concentration of conductors, or turns distribution, in the coils is varied for the purpose of maintaining good beam focus and convergence of a plurality of beams throughout the scanned raster.

Another feature of the invention which, in conjunction with some of those already described, produces a more efficient yoke and minimizes beam distortion is the spacing of the end conductors at greater than a minimum distance from the central axis. In the horizontal coils 31 and 32, for example, the forward end conductors 39 and 40 are grouped substantially as illustrated so that they are somewhat farther removed from the central axis than would be necessary merely to effect the connection between the two groups of conductors in the respective coils. Similarly, the end conductors 42 and 43 at the front or flared end of the yoke of the vertical coils 34 and 35 respectively are similarly treated. At the rear end of the yoke, the end conductors of the horizontal and vertical coils may be similarly treated, if desired. As indicated in Figure 3, a somewhat similar treatment is provided for the rear end conductors 44 of the vertical coil 34. This feature also is illustrated by the rear end conductors 21 of Figure 1 and again will be referred to in a latter description of Figure 4. It will be noted that, in forming the end conductors of all of these coils, a certain degree of flatness is maintained in the end conductor groups. With respect to the end conductors 39 and 40 of the horizontal coils 31 and 32, however, some additional bunching of the conductors is effected in order to remove a greater number of these conductors from the central axis. It will be understood that, if there is sufficient space, as there is likely to be between the front end of the yoke at the outer extremity of the flared section and the conical portion of the kinescope, a greater bunching of the horizontal end conductors may be effected so that even more of these conductors may be farther removed from the central axis.

For the achievement of maximum performance of such a yoke, it is desirable that there be a minimum of crossing of the side conductors of the respective coils. It is desired that the side conductors lie substantially parallel to one another in both the straight and flared sections of the yoke. Also, in the flared section, it is desirable that the side conductors extend axially for substantially the same distances before they are bent into the end conductors. In this way, a more uniform performance is achieved in all portions of the yoke.

Reference now will be made to Figure 4 for a more detailed description of the particular manner in which the flaring of the yoke should be effected in order to achieve optimum performance. In this figure, there are shown fragmentary cross sections of one coil 45 used for horizontal and another coil 46 used for vertical deflection in this case. This description will refer principally to the horizontal coil 45, it being understood that the same general description is intended to relate as well to the vertical coil 46 and that either coil may be used for horizontal or vertical deflection, with the longer coil 45 providing the greater deflection sensitivity. The side conductors 47 in the straight portion of the yoke extend generally parallel to the central axis for a substantial distance. In the region 48, these side conductors deviate from the central axis at a relatively small, substantially constant angle of 6°, for example, in one practical embodiment. In the succeeding region 49 of the flared section, the deviation from the central axis is at a varying angle so that this portion of the winding is arcuate in form. In the final region 51 of the flared section, the deviation of the coil conductors from the central axis is at a relatively large, substantially constant angle of, for example 50° to provide the necessary minimum clearance between the yoke and the kinescope.

In order that the deflection yoke embodying the present invention be made as efficient as practicable, it is necessary that it be provided with a core which is shaped generally in the same manner as the yoke coils are shaped. In other words, in the case of the present yoke, the core should have such a configuration that it will lie in the closest possible proximity to the coil assembly. The general configuration of this aspect of the core is shown in Figure 4. In the case of the present core, it is made in two ring-shaped assemblies lying respectively adjacent to the front and rear portions of the yoke. As shown in this figure, the rear core ring section 52 has a generally rectangular cross-section. It is seen that the internal configuration of the rear core ring 52 conforms substantially to the straight, or cylindrical, section, such as that including the side conductors 47 of the yoke coils 45 and 46. The core also includes a front ring section 53 which has an internal configuration conforming substantially in part to the cylindrical section of the yoke coils and in part to the flared, or frusto-conical, section of the coils. The external configurations of the two core rings 52 and 53 is also substantially cylindrical, as indicated. It will be understood that spacings between the coils 45 and 46 and between the coil 46 and the core rings 52 and 53 are indicated, not necessarily only for clarity in the drawing, but also to provide for the use of suitable insulation between the two coils and between the vertical coil and the core. Such insulation has not been shown in any of the figures of the drawings because it forms no part of the present invention and would only complicate the drawings.

In accordance with another feature of the invention, the core with which the yoke is provided is made up of a plurality of components. These components are arcuate members of suitable ferromagnetic material, such as ferrite which fit over the insulated coil assembly as closely as possible for maximum yoke sensitivity. As shown in Figure 5, each of the core rings 52 and 53 comprises four arcuate members. The rear ring 52 has four arcuate members, such as 54, each extending circumferentially for approximately 90°. Similarly, the front ring 53 comprises four substantially 90° arcuate members, such as 55. It is to be noted that the two rings 52 and 53 occupy substantially the entire space between the end conductors 42 and 44 of the vertical coils of the yoke, with space allowed for insulation, if needed. This is a preferred arrangement. However, another acceptable arrangement is one in which the adjacent edges of the rings 52 and 53 do not abut one another, but are spaced as much as a quarter of an inch, or more. Similarly, it is to be noted that, in all cases, it is not necessary that the front core ring 53 extend all the way through the flared section of the yoke in order to obtain many of the advantages of the flared yoke configuration. The arrangement shown, however, is the preferred one since it gives maximum performance of the apparatus.

Another feature of the invention that is to be noted with reference to Figure 5 is the staggering of the abutting ends of the arcuate members, such as 54 of the core ring 52, relative to the abutting ends of the arcuate members, such as 55 of the ring 53. An advantage of such a construction is that manufacturing tolerances do not have to be maintained as close as with other types of construction. As a result, it is necessary to test only a relatively small number of yokes in order to effect the desired quality control. It has been found that by staggering of the core ring sections, especially when the adjacent edges of the rings are abutting, as in the preferred form of this apparatus, a somewhat greater deflection sensitivity is achieved than would otherwise be possible. This occurs because even though there are gaps or discontinuities between the abutting ends of the arcuate members in either or both of the core rings, a partial compensation is made for any resulting increase in the reluctance of the magnetic circuit by the provision of an alternate flux path through the adjacent arcuate members in the other of the two core rings. In the construction of such a yoke, it is materially easier to maintain the low reluctance of the magnetic circuit at a minimum between the adjacent edges of the two core rings than it is between the abutting ends of the arcuate members of either of the two rings. The shape of each of the core segments of the ring 53, such as a step 56 at the front end (Figure 4), permits greater ease of molding. Without the step 56, a knife edge on the molding ram would be required, with an attendant high mold cost maintenance.

Figure 6, to which reference now will be made, is a transverse cross-sectional view of the assembled yoke taken in the straight, or cylindrical, section thereof. It shows the relationship of the horizontal coils 31 and 32 relative to one another and also to the associated vertical coils 34 and 35. The fixed width gaps 38 between the adjacent edges of the horizontal coils 31 and 32 are shown. Also, the substantially abutting relationship of the adjacent edges of the vertical coils 34 and 35 is shown. In addition, the annular core 22 comprising the rings 52 and 53 is shown in relation to the yoke windings. It is to be noted that the core 22 comprises two sets of four substantially 90° arcuate members substantially as previously described with reference to Figure 5. Alternatively, this core may be made with as few as two 180° core segments. There also is shown in this figure a band 58 extending around the core 22, securely clamping the parts thereof together and in intimate association with the yoke windings. This figure also shows the general cross-sectional configuration of the yoke windings illustrating the varied turn distribution by which the desired beam focus and/or multi-beam convergence is secured.

This turn distribution in the yoke windings does not follow the somewhat popular cosine or cosine squared distribution. It has been found that neither of these turn distributions provides the desired uniformity of beam focus, or maintenance of convergence in multi-beam kinescopes. Accordingly, the turns distribution in the windings of the yoke in accordance with the present invention is, in general, in accordance with the following table. The table of values has reference to Figure 7 of the drawings in which "T" is the maximum width of a coil; "$t$" is the thickness of $\alpha$ coil in a direction parallel to the thickness "T" at any angle $\alpha$ from the maximum width position in accordance with cosine distribution; and "$d$" is the same dimension as "$t$" except as actually employed in the yoke in accordance with this invention. It will be understood that where references are made to coil dimensions, this is merely a convenient term respecting the number of conductors in that particular part of the coil. In using this table, the following relationships are those referred to.

$$t=T\cos\alpha \text{ or } \frac{t}{T}=\cos\alpha$$

$$d=T(\cos\alpha)^n$$

$d$=actual dimension of coil at angle $\alpha$

| $\alpha$ | $\cos\alpha$ | $\cos^2\alpha$ | $t$(cos dist.) | $t$($\cos^2$ dist.) | $d$ | $n$ |
|---|---|---|---|---|---|---|
| 0° | 1.000 | 1.000 | .110 | .110 | .110 | 0 |
| 15° | .966 | .933 | .106 | .102 | .110 | 0 |
| 30° | .666 | .750 | .095 | .083 | .109 | .063 |
| 45° | .707 | .500 | .078 | .055 | .107 | .080 |
| 60° | .500 | .250 | .055 | .028 | .100 | .137 |
| 66° | .407 | .166 | .045 | .018 | .094 | .175 |

It may be seen from the foregoing table, with reference to Figure 7 of the drawings, that the actual turns distribution "$d$" of the coils in accordance with the present invention is materially different from the theoretical turns distribution "$t$" which would be obtained if either a cosine or a cosine squared distribution of the turns were used. In either case, when the angle $\alpha$ is zero, both the theoretical turns "$t$" and the actual turns "$d$" are equal to the maximum turns "T." At 30° from the point of maximum number of turns, for example, it is seen that the theoretical turns "$t$" for cosine distribution equals .095, which is derived by multiplying the maximum turns "$t$"=.110 by the cosine of 30°, which is .866. In actuality, in accordance with this invention, the turns distribution at 30° "$d$"=.109 which is derived by multiplying the maximum turns "T"=.110 by .992 which is the cosine of 30° to the .063 power. Similar differences between the actual turns distribution employed in the yoke in accordance with this invention and the turns distribution which would be required to satisfy either a cosine or a cosine squared distribution axis for all of the portions of the coil, are generally indicated in the table. Another noteworthy feature of this aspect of the invention is the actual turns distribution does not vary in accordance with any fixed power of the cosine of the angle. As indicated in the table, this power "$n$" varies from 0 at 0° to .175 at a 66° angle, which is about the extent of the turns distribution of either of the coils of the present yoke. Some modification of the turns distribution "$d$" can be used successfully provided the window openings 36 and 37 and the spacer 38 (Figure 1) are modified accordingly.

Figure 8:
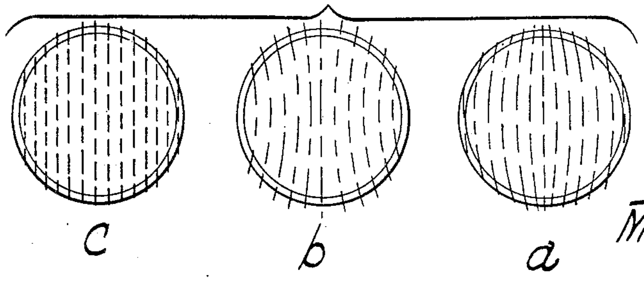

Figure 8 shows the flux patterns in different portions of the yoke in accordance with the present invention. Figure 8*a* shows the shape of the field at the rear end of the yoke and is seen that it is slightly barrel-shaped. Figure 8*b*, which shows the shape of the field substantially at the center of the yoke, for example, including the effective center of deflection 23 of Figure 1, and indicates that it is slightly pin-cushion shaped. Figure 8*c*, which shows the shape of the field at the small end of the flared section, and indicates that the field at this point is substantially uniform.

It is seen from the foregoing description of an illustrative embodiment of the present invention that there is provided an electromagnetic deflection yoke for cathode ray tubes of the single or multi-beam types which is considerably more efficient than yokes heretofore employed for similar uses. This increased efficiency derives generally from the use of a new and improved shape of the coil structure, together with a new and improved shape and arrangement of a core structure and the inter-relationship between the coil and core structures.

The new coil shape is one which includes straight and flared sections, the latter being at the forward end of the yoke. Such a coil shape provides additional side conductor length which increases the useful "X" and "Y" components of the produced field, whereby to effect a better electron beam deflection and, at the same time, to increase the ratio of the combined "X" and "Y" components to the undesired axial "Z" component produced by the end conductors, thereby minimizing the deleterious effects of such a field component such as causing beam distortion or misconvergence of multi-beam kinescopes. The use of a coil structure such as that employed in the yoke in accordance with the present invention moves the effective center of deflection forwardly toward the conical portion of a kinescope, when the yoke is used with such a cathode ray device, whereby wider angles of deflection may be achieved without the beam striking the side of the tube. Also, the lengthening of the coil and core structure as a result of the new shapes thereof has the beneficial effect of increasing the length of the yoke, whereby to effect a material increase in the deflection sensitivity thereof without reducing the required clearance between the deflected beam or beams and the kinescope cone. In a practical embodiment of a yoke in accordance with this invention, the length of the horizontal coil is increased by approximately 7% over equivalent yokes for smaller deflection angles previously employed. Similarly, approximately at 20% increase is effected in the length of the vertical coil. The core which is used in the present yoke is increased by more than 65% over cores previously used.

Another advantage of a yoke in accordance with the present invention is that it is capable of maintaining good beam focus and multi-beam convergence throughout a relatively wide deflection angle and, at the same time, of maintaining substantial rectangularity of the raster scanned on commercially available, curved face kinescopes. These two apparently irreconcilable achievements are effected by the practical compromising in the turns distribution of the coils and in the arrangement thereof with respect to one another. The turns distribution, which is set forth in particularity for one illustrative embodiment of the invention, is neither a cosine nor a cosine squared function of the angles subtended by the coil. Good raster rectangularity is obtained in large measure by properly placing the coils relative to one another, a typical example of which is the maintainance of the described gaps between adjacent portions of the horizontal coils and the substantial abutment of adjacent portions of the vertical coils.

It also is to be understood that while the invention has been described with particular reference to the relationship of the yoke to a kinescope for image-reproducing purposes in a television receiver, for example, it also is susceptible of use with other types of cathode ray apparatus. For example, any applications requiring wide angle deflection with good beam focus and raster rectangularity in camera or pickup tubes may also utilize a yoke in accordance wtih this invention. Similarly, signal storage tubes employing deflected electron beams also may employ a yoke of this character.

The nature of the invention having been set forth in the foregoing description of an illustrative embodiment thereof, its scope is pointed out in the appended claims.

What is claimed is:

1. A deflection yoke coil for a cathode ray tube comprising, a plurality of turns of wire, each of said turns including two side conductors extending longitudinally of a central axis and two end conductors extending transversely of said central axis and connecting said side conductors, each of said side conductors having a main portion extending for a predetermined distance along and lying substantially parallel to said central axis and an extended portion extending for less than said predetermined distance along and outwardly deviating from said central axis, and one of said end conductors connecting the extended portions of said side conductors being spaced more than a minimum distance from said central axis, such that said end conductors connecting the extended portions of said side conductors are located radially outside a circle defined by the ends of the extended portions of said side conductors and by points symmetrically located with respect to said ends on the opposite side of said central axis.

2. A deflection yoke coil for a cathode ray tube comprising, a plurality of turns of wire, each of said turns including two side conductors extending longitudinally of a central axis and two end conductors extending transversely of said central axis and connecting said side conductors, each of said side conductors having a main portion lying substantially parallel to said central axis and an extended portion outwardly deviating at a predetermined angle from said central axis, said main portion constituting a large part of the total axial length of said coil, and that one of said end conductors connecting the extended portions of said side conductors being spaced more than a minimum distance from said central axis, such that said end conductors connecting the extended portions of said side conductors are located radially outside a circle defined by the ends of the extended portions of said side conductors and by points symmetrically located with respect to said ends on the opposite side of said central axis.

3. A deflection yoke coil for a cathode ray tube comprising, a plurality of turns of wire, each of said turns including two side conductors circumferentially spaced about and extending longitudinally of a central axis and two end conductors extending transversely of said central axis and connecting said side conductors, each of said side conductors having in order a main portion lying substantially parallel to said central axis, an extended portion outwardly deviating from said central axis at a constantly increasing angle, and another extended portion outwardly deviating from said central axis at a substantially constant angle, said main portion being greater in length than the axial length of the remaining portion of said side conductors.

4. A deflection yoke coil for a cathode ray tube comprising, a plurality of turns of wire, each of said turns including two side conductors circumferentially spaced about and extending longitudinally of a central axis and two end conductors extending circumferentially about said central axis and connecting said side conductors, each of said end conductors being bent outwardly in a plane transverse of said central axis, each of said side conductors having in order a main portion lying substantially parallel to said central axis, a first extended portion outwardly deviating from said central axis at a relatively small substantilly constant angle, a second extended portion outwardly deviating from said central axis at a constantly increasing angle, and a third extended portion outwardly deviating from said central axis at a relatively large substantially constant angle, said main portion constituting a relatively large part of the total axial length of said coil.

5. A deflection yoke coil for a cathode ray tube comprising, a plurality of turns of wire, each of said turns including two side conductors circumferentially spaced about and extending longitudinally of a central axis and two end conductors extending circumferentially about said central axis and connecting said side conductors, each of said end conductors being bent outwardly in a plane transverse of said central axis, each of said side conductors having in order from back to front a main portion extending for a relatively large distance along and lying substantially parallel to said central axis, a first extended portion outwardly deviating from said central axis at a relatively small substantially constant angle, a second extended portion outwardly deviating from said central axis at a varying angle, a third extended portion outwardly deviating from said central axis at a relatively large substantially constant angle, said combined extended portions extending for a relatively small distance along said central axis, and that one of said end conductors connecting the extended portions of said side conductors being spaced from said central axis by sufficiently more than a minimum distance to be rendered inoperative by said spacing and the extended portions of said side conductors to produce an appreciable adverse field effect, said end conductor spacing being more than the distance of the main portions of said side conductors from said central axis.

6. A deflection yoke coil for a cathode ray tube comprising, a plurality of turns of wire, each of said turns including a pair of side conductors extending generally longitudinally of a central axis and a pair of end conductors extending generally transversely of said central axis and connecting said side conductors, each of said side conductors having a portion lying substantially parallel to said central axis and a portion outwardly deviating from said central axis, said parallel portion constituting a large portion of the total axial length of said side conductor, each group of corresponding ones of said side conductors having a varying conductor distribution in a cross-section normal to said central axis, and said conductor distribution being of such configuration that the ratio of the cross-sectional thickness of the group at any radial angle to the maximum thickness of the group is substantially the same in all axially normally cross-sections of both the parallel and deviating portions of said side conductors, each of said groups of side conductors extending circumferentially around said central axis through a predetermined angle, said predetermined angle being substantially the same in all axially normal cross-sections of both the parallel and deviating portions of said side conductors.

7. A deflection yoke coil for a cathode ray tube as defined in claim 6 wherein, each of said groups of side conductors extends circumferentially around said central axis through a predetermined angle, said side conductor distribution varying from a relatively small percentage of the total side conductors at one limit of said predetermined angle to a larger percentage of the total side conductors at the other limit of said predetermined angle, and substantially the same percentages of the total side conductors per circumferential degree within said predetermined angle being maintained in all axially normal cross-sections of both the parallel and deviating portions of said side conductors.

8. A deflection yoke for a cathode ray tube comprising, a pair of coils each having two groups of a plurality of side conductors, corresponding groups of said side conductors being mutually diametrically disposed about a central axis, each of said side conductors having a main portion lying substantially parallel to said central axis and an extended portion outwardly deviating from said central axis, the main portions of said side conductors extending along said central axis for at least the same distance as the extended portions of said side conductors, said side conductor groups extending circumferentially about said central axis in a manner to provide an opening between the inner edges of the side conductor groups of each of said pair of coils, each of said openings having a substantially constant width in substantially all axially normal cross-sections of the parallel side conductor portions of said coils, and each of said openings in substantially all axially normal cross-sections of the deviating portions of said coils having a width which varies as a function of said side conductor deviation such that each of said openings is of substantially the same number of degrees of arc in substantially all axially normal cross-sections of said parallel and deviating portions of said side conductors.

9. A deflection yoke for a cathode ray tube as defined in claim 8 wherein, the circumferential extension of each of said side conductor groups is of a character to provide a gap of predetermined width between adjacent outer edges of the respective side conductor groups of said pair of coils, said predetermined gap width being maintained in substantially all axially normal cross-sections of both the parallel and deviating side conductor portions of said coils.

10. A deflection yoke for a cathode ray tube comprising, horizontal and vertical windings having respective pairs of coils, the coils of each winding being oppositely disposed to one another about a central axis and the coils of one winding having a substantially 90° angular portion about said central axis relative to the corresponding coils of the other winding, each of said coils having two groups of a plurality of side conductors and two groups of a plurality of end conductors connecting said side conductors, each of said side conductors having a portion lying substantially parallel to said central axis and a portion outwardly deviating from said central axis, the main portions of said side conductors extendnig along said central axis for a greater distance than the extended portions of said side conductors, the side conductor groups of each of said coils extending circumferentially about said central axis in a manner to provide an opening between the inner edges of said side conductor groups of substantially the same number of degrees of arc in substantially all axially normal cross-sections of both the parallel and deviating side conductor portions of said coil, the circumferential extension of the side conductor coil groups of said vertical winding being of a character to effect the substantial mutual abutment of the outer edges of said vertical winding side conductor groups within said respective openings of the horizontal winding coils, and the circumferential extension of the side conductor coil groups of said horizontal winding being of a character to provide gaps between adjacent outer edges of the respective side conductor groups of said pair of horizontal coils, said gaps being within said respective openings of the vertical winding coils and the width of said gaps being maintained substantially constant in all axially normal cross-sections of both the parallel and deviating side conductor portions of said horizontal coils.

11. A deflection yoke for a cathode ray tube as defined in claim 10 wherein, the side conductor groups of the coils of one of said windings extend axially for a greater distance than the side conductor groups of the coils of the other of said windings, thereby making one winding longer than the other, and the longer of said windings being employed for deflection in the direction requiring the greater deflection sensitivity.

12. A deflection yoke coil for a cathode ray tube comprising, a plurality of turns of wire, each of said turns including a pair of side conductors extending generally longitudinally of a central axis and a pair of end conductors extending generally transversely of said central axis and connecting said side conductors, each of said side conductors having a portion lying substantially parallel to said central axis and a portion outwardly deviating from said central axis, said parallel portion constituting a relatively large part of the total axial length of said side conductor, each group of corresponding ones of said side conductors having a varying conductor distribution in a cross-section normal to said central axis, said conductor distribution being substantially the same in all axially normal cross-sections of both the parallel and deviating portions of said side conductors, each of said groups of side conductors extending circumferentially around said central axis through a predetermined angle, said side conductor distribution varying from a relatively small percentage of the total side conductors at one limit of said predetermined angle to a larger percentage of the total side conductors at the other limit of said predetermined angle, substantially the same percentages of the total side conductors per circumferential degree within said predetermined angle being maintained in all axially normal cross-sections of both the parallel and deviating portions of said side conductors, the total circumferential extension of said two groups of corresponding side conductors being through a predetermined angle of less than 180°, and the circumferential extension of each of said groups of corresponding side conductors being through a predetermined angle of sufficiently less than 90° to form an opening substantially at the center of said coil, said opening extending circumferentially around said central axis through a predetermined substantially constant angle in all axially normally cross-sections of both the parallel and deviating portions of said side conductors.

13. A deflection yoke for a cathode ray tube comprising, a pair of coils each having two groups of a plurality of side conductors, corresponding groups of said side conductors being mutually diametrically disposed about a central axis, each of said side conductors having a main portion lying substantially parallel to said central axis and an extended portion outwardly deviating from said central axis, the main portions of said side conductors extending along said central axis for at least the same distance as the extended portions of said side conductors, said side conductor groups extending circumferentially about said central axis in a manner to provide an opening between the inner edges of the side conductor groups of each of said pair of coils, each of said openings having a substantially constant width in substantially all axially normal cross-sections of the parallel side conductor portions of said coils, and each of said openings in substantially all axially normal cross-sections of the deviating portions of said coils having a width which varies as a function of said side conductor deviation, the circumferential extension of each of said side conductor groups being of a character to provide a gap of predetermined width between adjacent outer edges of the respective side conductor groups of said pair of coils, said predetermined gap width being maintained in substantially all axially normal cross-sections of both the parallel and deviating side conductor portions of said coils, said yoke being further characterized in that said side conductor groups of each of said coils have a conductor distribution circumferentially of said central axis which varies similarly in both main and extended portions from a relatively small number of conductors at the inner edges thereof adjacent said openings to a larger number of conductors at the outer edges thereof adjacent said gaps.

References Cited in the file of this patent

UNITED STATES PATENTS

| | | |
|---|---|---|
| 2,207,777 | Blain | July 16, 1940 |
| 2,428,947 | Torsch | Oct. 14, 1947 |
| 2,565,331 | Torsch | Aug. 21, 1951 |
| 2,570,425 | Bocciarelli | Oct. 9, 1951 |
| 2,605,433 | Friend | July 29, 1952 |
| 2,611,003 | Friend | Sept. 16, 1952 |
| 2,692,355 | Sickles | Oct. 19, 1954 |
| 2,771,563 | Reinhard | Nov. 20, 1956 |

FOREIGN PATENTS

| | | |
|---|---|---|
| 654,545 | Great Britain | June 20, 1951 |

U. S. DEPARTMENT OF COMMERCE

PATENT OFFICE

CERTIFICATE OF CORRECTION

Patent No. 2,821,671 January 28, 1958

Jerrold K. Kratz et al.

It is hereby certified that error appears in the printed specification of the above numbered patent requiring correction and that the said Letters Patent should read as corrected below.

Column 4, line 26, for "soil" read -- coil --; column 5, line 31, for "latter" read -- later --; column 6, line 18, for "the rear" read -- this rear --; column 7, in the table at bottom of column, second column thereof, third item, for ".666" read -- .866 --; column 9, line 53, after "and" insert -- that --; column 11, line 7, for "normally" read -- normal --.

Signed and sealed this 8th day of April 1958.

(SEAL)
Attest:
KARL H. AXLINE

Attesting Officer

ROBERT C. WATSON
Commissioner of Patents